United States Patent
Billing et al.

(10) Patent No.: US 7,209,759 B1
(45) Date of Patent: Apr. 24, 2007

(54) METHOD AND SYSTEM FOR CUSTOMIZING DISTRIBUTED SHORT MESSAGE ROUTING

(75) Inventors: John David Billing, Chapel Hill, NC (US); Michael Wright, Raleigh, NC (US); Gail Gyurek, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/159,949

(22) Filed: Jun. 23, 2005

(51) Int. Cl.
*H04Q 7/20* (2006.01)
*H04Q 7/38* (2006.01)

(52) U.S. Cl. ............... 455/466; 455/414.1; 455/414.4; 455/412.1; 455/412.2; 455/426.1; 455/422.1; 455/403; 370/352; 370/355; 370/354; 370/389; 370/392

(58) Field of Classification Search ................ 455/466, 455/414.1, 414.2, 414.3, 414.4, 417, 403, 455/422.1, 426.1, 426.2, 412.1, 412.2, 432.1, 455/432.2, 445, 500, 517, 550.1, 518, 519, 455/520, 73; 370/352, 355, 354, 389, 392
See application file for complete search history.

(56) References Cited

U.S. PATENT DOCUMENTS

2004/0196858 A1* 10/2004 Tsai et al. .................... 370/401
2005/0176450 A1* 8/2005 Bantukul et al. ........... 455/466
2005/0202836 A1* 9/2005 Schaedler et al. .......... 455/466

OTHER PUBLICATIONS

Cisco Systems, Inc., Cisco IP Transfer Point Multilayer Short Message Service Routing Solution, itpms_wp.pdf, Jan. 1, 2003, Publisher: http://www.cisco.com/warp/public/cc/pd/witc/itp/prodlit/, Published in: Internet San Jose, CA, US.

* cited by examiner

*Primary Examiner*—Keith Ferguson
(74) *Attorney, Agent, or Firm*—Evans & Molinelli PLLC; Eugene Molinelli

(57) ABSTRACT

Techniques for dynamically distributing short messages include storing action data and parameter data. Action data indicates actions for forwarding a short message and includes an action to bypass a short message service center (SMSC). Parameter data indicates parameters in network protocol headers for a short message. Provider input data is received that indicates a special value set and a special action set. The special value set includes a value for a corresponding special parameter set that includes a parameter from the parameter data. The special action set includes an action to be performed if an actual value set matches the special value set. When a particular short message is received, it is determined whether an actual value set based on the particular short message matches the special value set. If so, then the short message is processed according to the special action set.

32 Claims, 6 Drawing Sheets

200
SS7 SIGNALING PACKET

| 270 APPLICATION DATA |
| 260 MAP |
| 250 TCAP |
| 240 SCCP |
| 230 MTP3 |
| 220 MTP2 |
| 210 MTP1 |

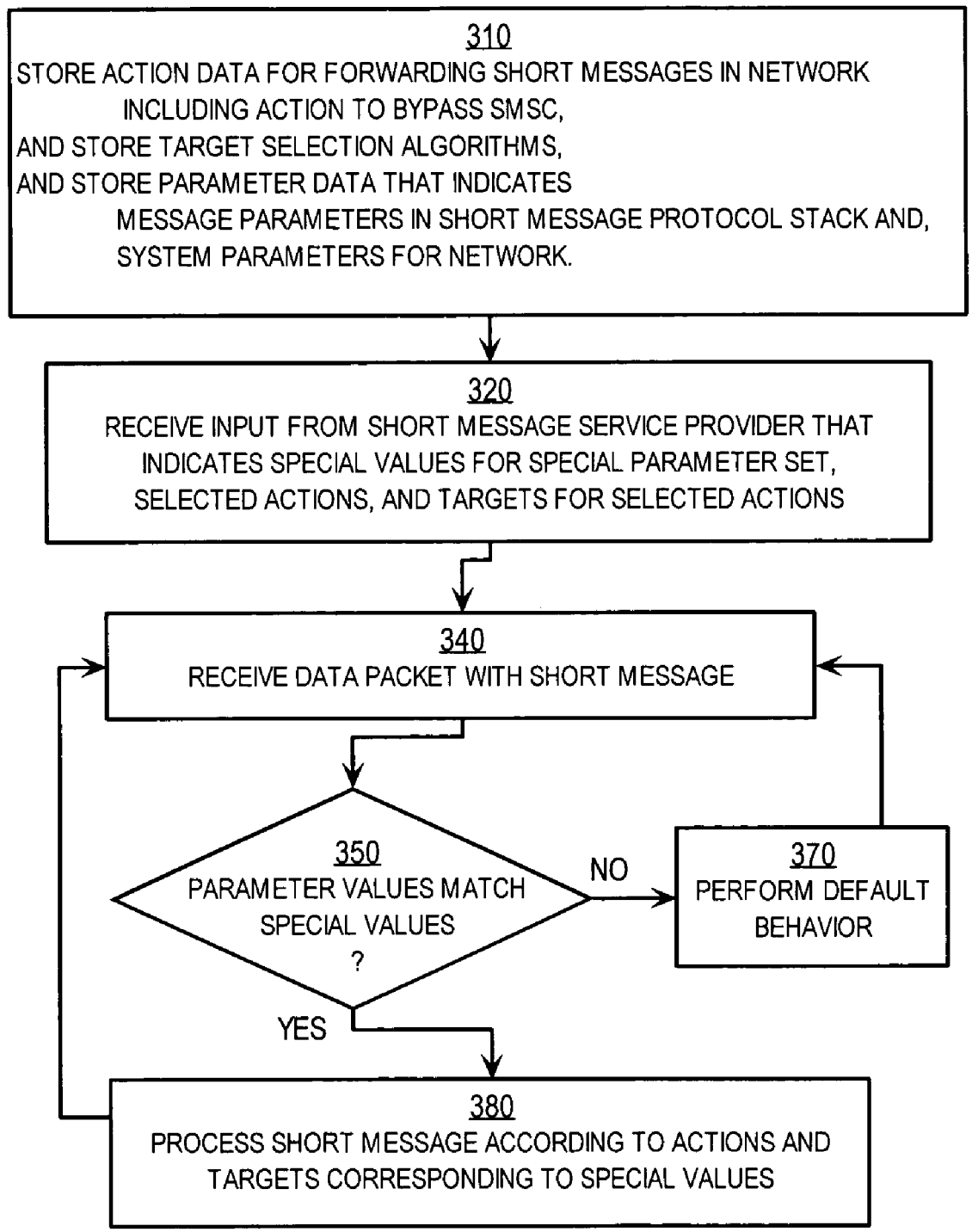

METHOD AND SYSTEM FOR CUSTOMIZING DISTRIBUTED SHORT MESSAGE ROUTING

BACKGROUND OF THE INVENTION

1. Field of the Invention

The present invention relates to distributing short messages on a signaling channel for mobile voice and data networks, also known as cell phone networks, and, in particular, to allowing a network provider to customize the routing of short messages to allow distinctive short message services.

2. Description of the Related Art

Networks of communications devices and general-purpose computer systems connected by external communication links are well known and widely used in commerce. The networks often include one or more network devices that facilitate the passage of information between end stations, such as telephones and general purpose computing devices, that originate or receive the information. A network node is a network device or end station connected by the communication links. Information is exchanged between network nodes according to one or more of many well known, new or still developing protocols. In this context, a protocol consists of a set of rules defining how the nodes interact with each other based on information sent over the communication links.

Telephone networks rely on circuit-switched network devices that establish a dedicated line between end stations for the duration of a telephone call. Signals are sent between network nodes to set up a circuit to service a call, to maintain the circuit during the call, and to free up (also called "tear down") the circuit at the end of the call. Between set up and tear down, voice or other data are transmitted over the circuit.

Mobile telephone networks handle additional signaling to maintain information about the current location of a wireless mobile telephone device and to adapt circuits during a call as the mobile telephone device moves from a cell of coverage by one antenna to a different cell of a different antenna. To accommodate the extra information demands of mobile telephone networks, signaling is accomplished by sending one or more small data packets formatted according to a special signaling protocol over the network. In some networks the signaling data packets are sent over the same communication links as the voice and data; and in some networks the signaling data packets are sent over dedicated signaling data links. A signal transfer point (STP) is a switch that relays messages between network switches and databases, such as databases that contain information about the owner, billing and location of mobile devices. In some networks, at least some signaling data packets are sent over a data packet switched network using one or more gateways between the circuit-switched or signaling links and packet-switched networks and one or more additional protocols.

Mobile telephone service providers have begun to offer a short message service. Short messages use the signaling infrastructure of the telephone network to transmit a short message of text or data between end stations. Short messages are well suited for the small display area of most mobile telephones. For example, current Global System for Mobile communications (GSM) standards for short messages limit the amount of data included in each signaling data packet, also called a control plane data packet, to 140 octets (an octet is eight binary digits called bits), enough for 140 Latin characters. Somewhat longer messages can be accommodated by spreading them over several signaling data packets. Because not all mobile wireless users are available at all times, short messages are stored and sent when the recipient of the message becomes available.

To support the short message service, one or more of a special device called a Short Message Service Center (SMSC) is included in the mobile telephone network. The SMSC receives the short messages over the STP network, stores short messages received from end stations, determines when recipients are available to receive the short messages, and forwards the messages over the STP network when the recipients of the messages become available. Multiple SMSCs are employed to provide backup for each other. An SMSC is a sophisticated and expensive device, capable of storing and processing thousands of messages per second. Mobile telephone service providers (hereinafter called providers) typically pay a license fee to vendors of the SMSCs based on the maximum number of messages per second handled by a SMSC. The providers recoup their licensing expenses by charging users a small per message or flat fee to communicate with short messages.

The short message service has become exceedingly popular among mobile phone users. Large sporadic spikes in short message traffic occur as mobile phone users react to circumstances that affect them, such as large public events, school closings, and news events. Some content broadcasters generate revenue by inducing short message traffic and taking a percentage of the short message billings that result. For example, some contests accept entries by short messages. An important example of short message traffic induced by broadcasters is viewer interaction tabulated by broadcasters, such as in response to polling questions or to vote on the performance of one or more contestants.

The increased use of short message traffic causes a dilemma for mobile service providers when the short message traffic is exceedingly heavy for a short period of time. For example, audience response and voting traffic can involve millions of messages in a few seconds in response to events that are days apart. To handle such peak traffic, the service providers need SMSC licenses of hundreds of thousands of short messages per second that are very expensive. Yet such licenses are not cost effective because such peaks are widely separated in time, and the high capacity is excessive for the intervening periods of time.

A recent approach is to use lower cost devices than STP and SMSC to handle some signaling and short message traffic. For example, a packet-switched network (PSN), such as networks using the Internet Protocol (IP) are used to send some signaling data packets and short messages, thus off-loading these data packets from more expensive STP devices. Special protocols for sending signaling data packets over IP have been developed, including the Universal Computer Protocol (UCP) and the Short Message Peer-to-Peer (SMPP) protocol. UCP is described at the time of this writing in "Short Message Service Centre 4.6 EMI-UCP Interface Specification," CMG Wireless Data Solutions, London, April 2003, the entire contents of which are hereby incorporated by reference as if fully set forth herein. SMPP is described at the time of this writing in "Short Message Peer-to-Peer Protocol Specification, Version 5.0," SMS Forum, Northgrove Limited, Dublin, 2003, the entire contents of which are hereby incorporated by reference as if fully set forth herein. A gateway device translates between STP signals and UCP or SMPP in IP data packets. For example, IP Transfer Point (ITP) switches, available from Cisco Systems of San Jose, Calif. serve as a gateway between STP nodes and PSN nodes. PSN routers and switches are widely used in public and private networks, and can often be obtained and operated more cheaply than STP devices. Many approaches that use a PSN for some or all short message traffic, still utilize one or more SMSCs to store and forward all short message traffic.

In another recent approach, some short message traffic is diverted from the one or more SMSCs. For example, voting traffic is destined for one or more vote-counting processes executing on one or more host computers connected to a network. The recipient of these messages is fundamentally different from another mobile user. For example, the vote-counting process is effectively always available for the time when short messages to be counted are valid; so, the store and forwarding capability of the SMSC is not needed. Thus, in some recent approaches, short message traffic addressed to a vote-counting process is diverted by one or more network devices from any SMSC and instead forwarded directly to the vote-counting process. Since ITP switches are configurable, such diversion of traffic from SMSCs is done by configuring ITP switches to direct such traffic to the vote-counting processes. Gateway suppliers, such as the ITP supplier, configure these devices to perform such diversion.

In some approaches, the gateway devices are configured to attempt immediate delivery for short messages addressed to another mobile device, because many times the recipient device is available. Only if the recipient is unavailable, is the short message sent on to the SMSC to engage the store and forward capability of the SMSC.

While suitable for many purposes, the recent approach of configuring PSN gateway switches to divert short message traffic from SMSCs has some deficiencies. For example, the target of the diverted traffic may change over time or more targets for diverted traffic may be added over time. The configured gateway devices are then incompatible with the service the provider can offer in commerce. The service provider then contracts with the vendor of the gateway devices to develop new configuration data for the gateway devices and waits for the vendor to deliver the configuration data or new devices. With many different service providers vying for the vendors' attention, the delays between the design of the desired service and the delivery of the configured device may be unacceptably long.

As another example, the type of mobile to mobile short message traffic for which immediate delivery is attempted may vary from one provider to another. A provider who spans several time zones may wish to attempt immediate delivery only for mobile users in the same or adjacent home time zones. Another provider, with a smaller service area, may attempt immediate delivery for all short messages. Other providers may have different criteria for attempting immediate delivery, such as the current location of one or more mobile users, rather than their home locations.

In other examples, a short message service provider may want to block short message traffic from a blacklist of troublesome mobile users, allow short message traffic only from a "whitelist" of paying mobile users, and divert some short message traffic to government authorities during the effective dates of a legal wire-tap order.

Other desirable or competitive short message services may not be predictable when gateway devices are delivered to service providers. The providers are likely to want changes in short message services to meet changing customer demands and interests. A slow response to mobile user demands for improvements and other changes in short message service may lead to an exodus of such users from the provider. Thus, providers of short message services are hindered by needing vendor involvement in accommodating changes to the short message services they provide.

Based on the foregoing, there is a clear need for techniques to configure gateway devices for processing short messages that do not suffer the deficiencies of prior art approaches. In particular, there is a need for techniques that allow short message service providers to configure short message gateway devices without involvement by vendors of the gateway devices.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram that illustrates at a high level a method for configuring short message gateway devices by a short message service provider, according to an embodiment;

DETAILED DESCRIPTION

A method and apparatus are described for changing dynamic distribution of short messages in a communication network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the present invention are described in the context of short messages in Signaling System 7 (SS7) data packets on a Global System for Mobile communications (GSM) mobile telephone network with ITP gateways to a packet switched network using the Internet Protocol (IP); but, the invention is not limited to this context. In other embodiments, a different mobile telephone network, such as a Code Division Multiple Access (CDMA) or a Time Division Multiple Access (TDMA) mobile telephone network, or a later generation of mobile networks, supports short message service using its signaling protocol that is different from SS7, and which may or may not include one or more gateways to a packet-switched network using the IP or different protocol. Furthermore, many examples in the following description reflect messages originating on the mobile device and directed to an SMSC; but the invention is not limited to such traffic. In other embodiments, short messages are processed that are directed from an SMSC to applications or mobile devices.

1.0 Mobile Telephone Network Overview

Figure 1:
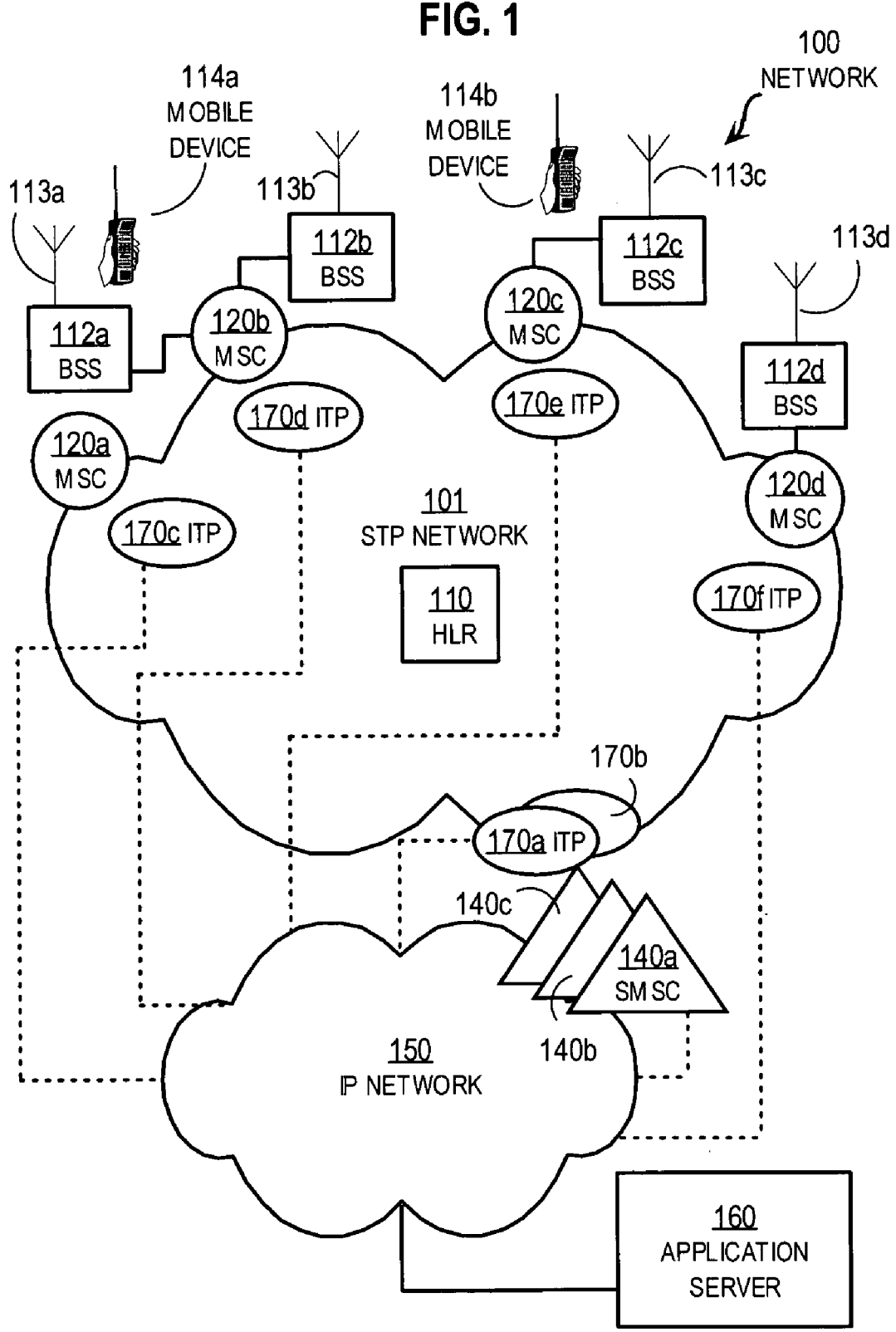
FIG. 1 is a block diagram that illustrates a mobile communications network with gateways to a packet switched network for signaling and short message service.

FIG. 1 is a block diagram that illustrates a mobile communications network 100 with gateways to a packet switched network (PSN) for signaling and short message service. The network 100 includes a circuit-switched network, a STP signaling network 101, and an IP packet-switched network 150. The mobile circuit-switched network includes base station systems (BSSs), such as BSS 112a, BSS 112b, BSS 112c, BSS 112d, and others, collectively referenced hereinafter as BSS 112. Each BSS 112 has one or more antenna for conducting wireless communications with one or more mobile devices. As depicted in FIG. 1, BSS 112a through BSS 112d include antennae 113a, 113b, 113c, 113d, respectively, collectively referenced hereinafter as antenna 113. FIG. 1 also depicts two mobile devices 114a, 114b, such as cell phones, collectively referenced hereinafter as mobile devices 114.

The BSS 112 are connected to mobile switching centers (MSCs), such as MSC 120a, 120b, 120c, 120d, collectively referenced hereinafter as MSC 120. A MSC routes a call from the BSS to another network node in the circuit-switched network and provides subscriber services, such as determining whether a call is from a mobile service subscriber (authentication), billing, and updating the current subscriber location. The MSC often initiates signaling for call setup, maintenance and tear-down over the STP network 101. As shown in FIG. 1, BSS 112a, 112b are connected to MSC 120b; BSS 112c is connected to MSC 120c; and BSS 112d is connected to MSC 120d.

The STP network includes a home location register database, HLR 110, a cluster of SMSCs 140a, 140b, 140c (collectively referenced herein as SMSC 140) and multiple distributed ITPs 170a, 170b, 170c, 170d, 170e, 170f (collectively referenced herein as ITP 170). The HLR 110 is a database of information about each subscriber, including an address of the MSC that covers the subscriber's home location and the address of the MSC where the subscriber is currently located (or was last located). The SMSC is a process on one or more devices that receive, store and forward short messages, as described in the Background Section. The ITPs serve as a gateway to a PSN, such as IP network 150, for more economically routing signal data and short messages among other network nodes on STP network 101. The communication links between ITPs on STP network 101 and network nodes on IP network 150 are represented in FIG. 1 by dashed lines.

Some short messages are intended for processing by a software application, e.g., a process executing on a computer on a PSN, such as IP network 150. For example, application server 160 is a process executing on a host computer on the IP network 150 that receives short messages. For example, application server 160 is a vote-counting process. To send short messages to application programs on a PSN, such as application server 160, each SMSC is also linked to the PSN network, such as IP network 150.

In some networks, one or more ITPs, e.g., ITPs 170a, 170b, serve as proxies for the cluster of SMSCs 140. Short messages are routed by network nodes, such as STP devices and ITPs 170, to the SMSC proxy ITPs 170a, 170b. The proxy ITPs 170a, 170b, then load balance and distribute the short messages among the SMSCs 140a, 140b, 140c in the SMSC cluster 140. In some embodiments, multiple ITPs that are not proxies for SMSCs are distributed in the STP network, especially in the vicinity of MSCs 120 that are expected to receive many short messages.

In the illustrated embodiments, proxy ITPs 170a, 170b, or other ITPs, or both bypass the SMSC cluster 140 to forward at least some short messages. The conditions under which some short messages bypass SMSCs 140 and the targets of those diverted short messages are determined by input received from the mobile telephone short message service provider (the "provider") in a method describe in more detail in a later section.

Figure 2:
FIG. 2 is a block diagram that illustrates a protocol stack for data packets used in signaling and short message traffic.

FIG. 2 is a block diagram that illustrates a protocol stack for data packets 200 used in SS7 signaling and short message traffic. The protocols are effective at different layers of operation within each network node, from generating and receiving physical signals of various types, to selecting a link for transferring those signals, to the format of information indicated by those signals, to identifying which software application executing on a computer system sends or receives the information. Signaling between nodes is typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer protocol. The header for a particular protocol typically indicates a type for the next protocol contained in its payload. The payload protocol is said to be encapsulated in the header protocol. The headers included in a packet traversing multiple heterogeneous networks, such as the Internet, typically include a physical header, a data-link header, an internetwork header, a transport header, and an application layer protocol.

In an SS7 signaling packet 200 typically used to carry short messages, headers are found for six protocols, with application data 270 found in the payload of the sixth protocol. The application data 270 may itself include an application layer header and an application layer payload. The six protocols, from the lowest layer to the highest are the first Message Transfer Part (MTP1) header 210, followed by the MTP2 header 220 and the MTP3 header 230. Those headers are followed by the Signaling Connection Control Part (SCCP) header 240, the Transaction Capabilities Application Part (TCAP) header 250, and the Mobile Application Part (MAP) header. The application data 270 follows the MAP header 260 in the SS7 data packet 200 and includes a short message in data packets that carry short messages.

The MTP1, MTP2, MTP3 headers provide information for physical, data link and network layer functions, as described in more detail in Section 1.1 of the reference book entitled *Interconnections Second Edition*, by Radia Perlman, published September 1999, the entire contents of which is hereby incorporated by reference as though fully set forth herein The SCCP header contains information for resolving addresses, such as a global title, and for locating devices in the network. A global title is an address that is used on the mobile telephone networks to communicate among different mobile telephone service providers. The TCAP header contains information for supporting non-circuit related information exchange between signaling points such as forming a session of multiple messages between the same two devices on the network. The MAP header contains information that identifies the parameters of the mobile message being exchanged, such as the originating mobile device and the target mobile device or application.

SMS processing has two distinct operation phases: submission and delivery. Submission is the act of submitting a message from the originating SME to the message delivery agent (SMSC or ITP). Delivery is the process of sending the short message to the intended recipient. For a Mobile Originated (MO) to Mobile Terminated (MT) scenario, the destination SME appears in the application data 270 on the submission, but in the MAP layer 260 on the delivery. Similarly, for MO submission, the origin SME is in the MAP layer; and for MT delivery, the origin SME is in the application data. To some extent, the ITP shields this difference from the provider, by allowing specification of "destination SME" and "origin SME."

According to illustrated embodiments of the invention described below, a network service provider may use information in any of these headers to determine which short message to divert through a PSN, and to which targets, without further involvement by vendors of PSN gateway devices.

2.0 Method for Configuring a Gateway for Short Messages

FIG. 3A is a flow diagram that illustrates at a high level a method for configuring short message gateway devices by a short message service provider, according to an embodiment. Although steps are shown in FIG. 3A and following flow diagrams in a particular order for purposes of illustration, in other embodiments the steps may be performed in a different order, or overlapping in time, or one or more steps may be omitted, or the method may be changed in some combination of ways.

In step 310, data is stored for recognizing short message provider input. In the illustrated embodiment step 310 includes storing action data, target selection algorithms, and parameter data. The data and algorithms may be stored in any manner known in the art. The data may be stored as lists in a flat file, as fields in a database, as text for prompts presented on a display device, or as reserved words in an interpreter process or compiler process that parses input during a later step, or in some combination of ways.

The action data indicates different ways to process a short message. Actions are used by a short message service provider to define rules, as described in more detail below. As used herein, a rule is a conditional action. A rule is defined by the conditions for performing the action and the corresponding action. Table 1 lists action data for an illustrated embodiment. In other embodiments other data are used to indicate the same or different actions.

TABLE 1

Action data that indicates different ways to process a short message.

| Action data item | Meaning |
| --- | --- |
| block | The short message is dropped, i.e., not forwarded to any other network node. |
| group | The short message is forwarded to a group indicated by a group identifier that follows the "group" action data item. A group is a collection of multiple destination network nodes for a short message, including either SMSC or non-SMSC nodes. |

TABLE 1-continued

Action data that indicates different ways to process a short message.

| | |
| --- | --- |
| gt | The short message is forwarded to a subsystem indicated by a global title (GT) address that follows the "gt" action data item. A GT address indicates a particular process (called a subsystem) operating on a particular network node. |
| tt | The translation type for converting the GT address digits to a destination network node and subsystem is indicated by the code that follows the "tt" action data item. An optional action for GT forwarding, valid codes fall in range from 0 to 255. |
| gti | The type of GT address is indicated by the code that follows the "gti" action data item; e.g., the value 2 typically indicates an ANSI domain; the value 4 typically indicates an ITU domain. ANSI is the American National Standards Institute; and ITU is an international standards body. Valid range is 0 to 15. |
| np | The number plan for converting the GT address digits to a destination network node and subsystem is indicated by the code that follows the "np" action data item. Required for a gti code of 4. Valid codes fall in range from 0 to 15. |
| nai | The nature of address indicator for converting the GT address digits to a destination network node and subsystem is indicated by the code that follows the "nai" action data item. Required for a gti code of 4; valid codes fall in range from 0 to 127. |

| Action | Meaning |
| --- | --- |
| pc | The short message is forwarded to a network node indicated by a point code (PC) address that follows the "pc" action data item. |
| ssn | A subsystem indicated by the code that follows the "ssn" action data item. An optional action for PC forwarding, valid codes fall in range from 2 to 255. |
| deliver-mt | Immediate delivery of the short message is attempted to the destination as a mobile device. If the destination is not available, the short message is forwarded according to another rule, usually to an SMSC. |
| rule | The short message is processed according to a rule identified by the rule index that follows the rule action data item. |
| next-rule | The short message is processed according to the next rule in the sequence of rules. |
| obtain | Information is required from another network node prior to processing the message. For example, the origin mobile subscriber's International Mobile Subscriber Identifier (IMSI) may be needed in order to properly route or screen the message. |

In other embodiments other actions are included. In some embodiments, an action changes the contents of the message. In some embodiments, the action directs the message to a process that executes at the intermediate node that receives the short message instead of, or in addition to, directing the message to another network node. For example, in some embodiments a vote counting process is implemented on each ITP, and short messages directed to a vote counting address are counted instead at the first ITP they encounter. The processes on the ITPs then report their results to the vote counting server, e.g. server 160.

The stored target selection algorithms determine different ways to forward a short message to multiple destinations. In an illustrated embodiment, multiple destinations are indicated in a target group. Example target selection algorithms include, but are not limited to, broadcast to all destinations in the target group (broadcast); forward short message to one or more members of the group selected uniformly in turn (round-robin), forward short message to one or more members of the group selected non-uniformly in turn (weighted round-robin), forward short message to one or more members of the group based on state of the recipients, such as processing capacity of the recipients or congestion on links to the recipients (state-based selection); and some combination of the other selection algorithms. In some embodiments, a single target selection algorithm is stored. In some embodiments, no target selection algorithm is stored. For example, in some embodiments, a target selection algorithm is input by a short message service provider; and in some embodiments target groups are not used.

In an illustrated embodiment, the stored target selection algorithms include a weighted round-robin (WRR) selection algorithm to properly balance workload to targets (such as servers) of varying capacity. Each member of a target group is assigned a server weight in the range from 0 to 10. The value 0 indicates that the target is a backup and should only be used when all other targets with a weight greater than 0 have failed to respond, or are known to be unavailable. If a target becomes constrained (e.g., so busy as to request a reduction in the rate at which messages are sent to the target) or unavailable, then the WRR algorithm automatically adjusts to send traffic to the remaining servers that are not constrained.

The parameter data indicates different system and signaling message parameters used to distinguish different short message types and network conditions. Some parameters are used by a short message service provider to define conditions for rules and triggers, as described in more detail below. As stated above, a rule is a conditional action. A trigger is a filter used to distinguish messages that are subject to one or more rules from other messages that receive no special processing. Tables 2A and 2B list parameter data for an illustrated embodiment. In other embodiments other data are used to indicate the same or different parameters.

TABLE 2A

Parameter data that indicate different signaling message parameters.

| Parameter data item | Meaning |
|---|---|
| dest-port | The destination port number parameter that indicates a particular application process on a destination device as indicated in application data 270. Valid ports fall in range from 0 to 65535. |
| dest-sme | The destination short message entity (SME) parameter that indicates a destination device for a short message as indicated in the application data 270 or MAP layer 260. Also known as B-address. |
| dest-smsc | The destination Short Message Service Center (SMSC) parameter that indicates the SMSC to store and forward the short message as indicated in the MAP header 260. |
| orig-imsi | The source International Mobile Subscriber Identity (IMSI) parameter as indicated in the MAP layer 260. |
| orig-sme | The source short message entity (SME) parameter that indicates a source device for a short message as indicated in the application data 270 and MAP layer 260. Also called the A-address. |
| pid | The protocol identifier parameter that indicates a protocol for the application as indicated in the header for the application data 270. For MO submission and MT delivery, the pid refers to the application-to-application layer protocol being used between the SMEs. For application originated (AO) or application terminated (AT) messages, the pid could represent a protocol such as UCP or SMPP. |

TABLE 2B

Parameter data that indicate different system parameters.

| Parameter data item | Meaning |
|---|---|
| cdr-service-queue | The system parameter that indicates a state of a call-data-record (CDR) archival system. Valid states include "available," "congested" and "unavailable." |

TABLE 2B-continued

Parameter data that indicate different system parameters.

| Parameter data item | Meaning |
|---|---|
| interval | The system parameter that indicates an interval of time for which the rule is valid. |

The data stored during step 310 may be stored at any network node in network 100 that will determine how to forward short messages. In an illustrated embodiment, the data is stored at proxy ITPs 170a and 170b during step 310. In other embodiments, the data is stored during step 310 at one or more other ITPs, e.g., ITPs 170c, 170d, 170e, 170f located closer to MSCs 120.

In step 320, provider input data is received that indicates special values for a special set of parameters, selected actions, and targets for selected actions. The special parameter set is a subset of the parameters stored during step 310. Values are accepted as input if they lie within the valid range for the selected parameters. In some embodiments, qualifying keywords and wildcard symbols are used to express a range of values or how closely a value must be to "match" a specified parameter value. The selected actions are a subset of the actions stored during step 310. In some embodiments, the targets for selected actions are determined from a target group of multiple destinations using a target selection algorithm stored during step 310.

Any method may be used to receive this input data from a short message service provider. In some embodiments, the input data is retrieved from one or more files stored locally on a gateway device or remotely on some other device on network 100, such as on a device on IP network 150. In some embodiments, the files are formatted in a prescribed way, for example using keywords among the stored data items paired with corresponding values. In some embodiments, a human agent for the service provider manually enters the data on the gateway device, for example using keyword and value pairs, or in response to prompts presented on a display, as is well known in the art of receiving manual input. In some embodiments, the data is received in a requested or unsolicited message sent from another device on the network 100, such as from a proxy ITP 170a over the IP network 150.

In an illustrated embodiment described in more detail below with respect to FIG. 3B, the input data is received to determine triggers for further processing of short messages and rule sets of one or more rules to process those short messages that match the trigger.

The input data received during step 320 may be received at any network node in network 100 that will determine how to forward short messages. In an illustrated embodiment, the provider input data is received at proxy ITPs 170a and 170b during step 320. In other embodiments, the provider input data is received during step 320 at one or more other ITPs, e.g., ITPs 170c, 170d, 170e, 170f located closer to MSCs 120.

In step 340, a signaling data packet that contains a short message is received. For example, an SS7 data packet with a short message in application data 270 is received at proxy ITP 170a. The MAP layer 260 operation code or TCAP layer 250 application context identifies the message as either a Mobile originated (MO) SMS submission or a Mobile terminated (MT) SMS delivery. In the illustrated embodiment, the SS7 data packet is received on a STP communication link in STP network 101. In some embodiments, a data packet is received as payload in a PSN protocol, such as in a IP/SMPP payload on PSN 150.

In step 350 it is determined whether the values of message parameters in the data packet received in step 340 and current values of the system parameters match the special values for any of the special parameter set or sets received in step 320. If not, control passes to step 370 to perform default processing. In an illustrated embodiment described in more detail below with respect to FIG. 3C, the values for parameter sets for triggers and rule conditions are compared to the values of current system and message parameters during step 350. If the packet fails to match trigger values, then default processing includes sending the packet to its destination (e.g., to the SMSC). If, however, the packet matches the trigger values but fails to match any rule conditions, then default processing includes dropping the message, i.e., the message is caused to fail.

If it is determined in step 350 that the values of parameters in the data packet, received during step 340, and the current values of system parameters match the special values for any of the special parameter set or sets received in step 320, then control passes to step 380.

In step 380, the data packet is processed according to the actions selected and targets input during step 320 that correspond to the special values that match the data packet received and current system parameters. In an illustrated embodiment described in more detail below with respect to FIG. 3C, the actions are performed for single or multiple targets during step 380.

Figure 3B:
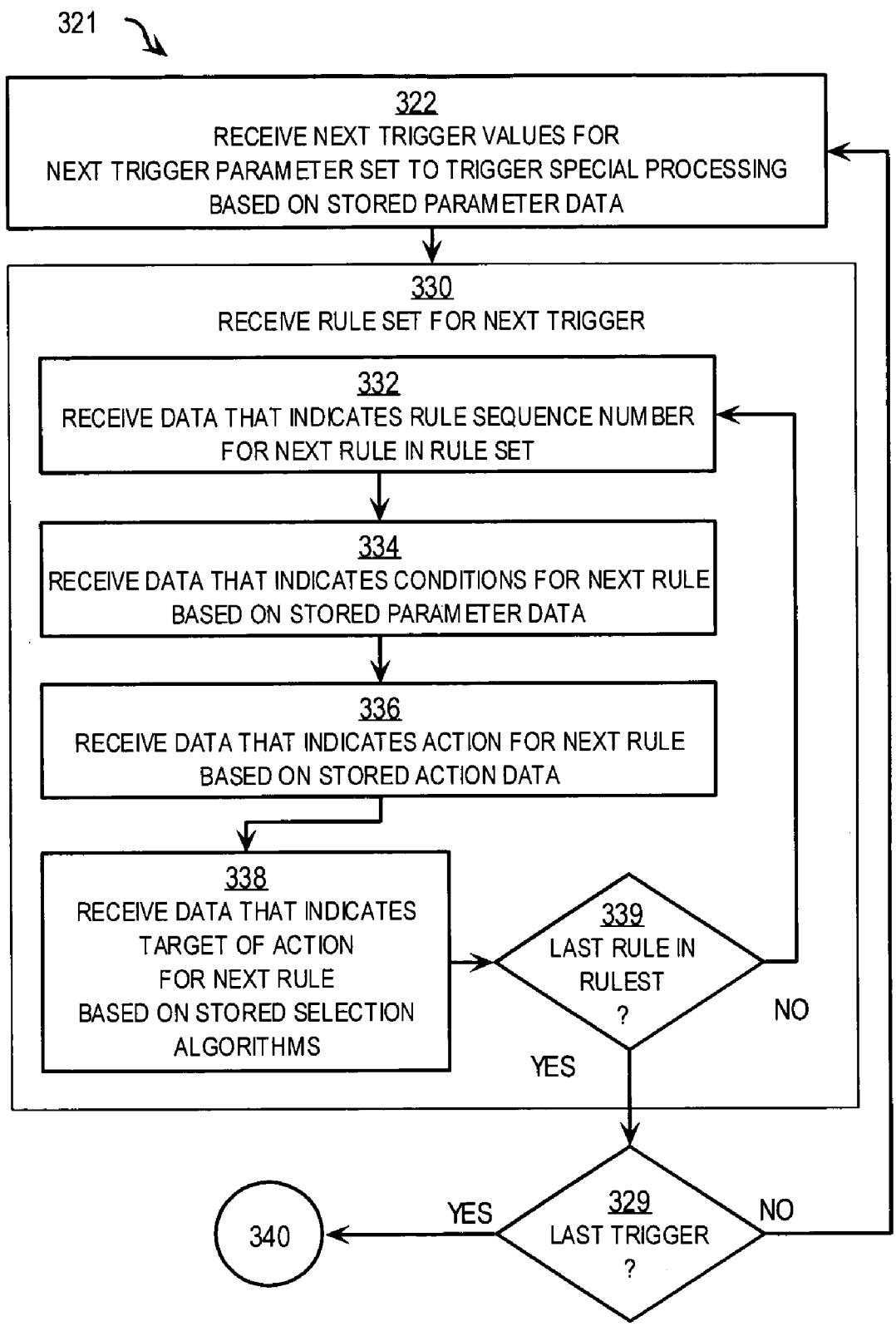
FIG. 3B is a flow diagram that illustrates in more detail a step of the method of FIG. 3A for receiving input from a short message service provider, according to an embodiment.

FIG. 3B is a flow diagram that illustrates in more detail a step 321 for receiving input from a short message service provider, according to an embodiment of method 300. Step 321 is a particular embodiment of step 320. Step 321 includes steps 322 and 330.

In step 322, data is received that indicates one or more values for a set of one or more parameters that define a trigger. This set of parameters is called a trigger parameter set and the corresponding values are called trigger values. The trigger parameter set is chosen from the parameters stored in step 310, described above. A trigger is used to quickly filter signaling data packets that are to receive special short message processing from those which are not. In various embodiments, zero, one or more triggers are defined. In embodiments with multiple triggers, step 322 includes receiving trigger values for one trigger, called the "next" trigger, of the multiple triggers. To distinguish among multiple triggers, each trigger is given a unique identifier. In an illustrated embodiment, the provider inputs a name for the trigger during step 322 along with the values for the set of parameters that define the trigger. When a data packet arrives that has values for the trigger parameter set of a particular trigger which match the trigger values, then the particular trigger is said to be "matched" or "pulled." When a data packet causes a particular trigger to be pulled, the data packet is processed using a rule set associated with that particular trigger, as described in more detail below with reference to FIG. 3C.

In some embodiments, a signaling data packet is addressed to a short message routing process on a network node, such as a short message routing process on an ITP. In such embodiments, the trigger parameter for at least one trigger is the subsystem destination (e.g., in the SCCP layer 240); and the trigger value is the subsystem number for the short message routing process of an ITP.

It is assumed, for purposes of illustration, that three triggers are defined. A voting trigger is defined to perform special processing of short messages when the destination of the message is a telephone number (e.g., dest-sme) associated with voting choices. Two wire-tap triggers are defined to perform special processing of short messages when the source (e.g., orig-sme) or receiver (e.g., dest-sme) of the message is a telephone number associated with a party subject to a legal wire-tap order. It is noted that intercepting traffic directed to the wire-tap address is an example of routing delivery messages after they have been sent by the SMSC; such routing does not bypass the SMSC. Intercepting traffic from the wire-tap address may bypass the SMSC. It is further assumed, for purposes of illustration, that the vote sponsor has a bank of telephone numbers from 900-555-2200 to 900-555-2299 for registering votes. Thus the provider defines the voting trigger for data packets with a dest-sme with the first eight decimal digits of 900-555-22. It is further assumed, for purposes of illustration, that the legal wire-tap is on a particular phone number 111-555-9876. Thus the provider defines a first wiretap trigger for data packets with a dest-sme address of 111-555-9876; and defines a second wiretap trigger for data packets with an orig-sme address of 111-555-9876.

Control then passes to step 330 to receive input data that indicates a rule set of one or more rules to use on signaling data packets that match the next trigger defined by the values most recently received in step 322. To distinguish one rule set from another, each rule set is given a unique name within a namespace for the short message service provider. In many embodiments, the provider is allowed to specify a name for a rule set; it is expected that the provider often uses the same name for the rule set and the corresponding trigger.

In the illustrated embodiment, each rule in a rule set is defined by a sequence number for executing the rule within the rule set, a set of values for a set of parameters that define conditions for the rule, and an action to perform if the conditions are satisfied, as described in more detail below with reference to FIG. 3C. Therefore, in the illustrated embodiment, step 330 includes steps 332, 334, 335, 338, 339.

In step 332, data is received that indicates a rule sequence number for a rule in the rule set. In embodiments with multiple rules in a rule set, step 332 includes receiving a sequence number for one rule, called the "next" rule, of the multiple rules. In embodiments with a single rule in a rule set, the sequence number, and step 332, may be omitted.

In step 334, data is received that indicates conditions for the next rule. The conditions for the next rule are determined by one or more values for a set of one or more parameters that define that rule's conditions. This set of parameters is called a rule parameter set and the corresponding values are called rule values for the next rule. The rule parameter set is chosen from the parameters stored in step 310, described above. When a data packet arrives that has pulled the trigger and has values, along with current system values, for the parameter set of the next rule that matches the rule values of the next rule, the next rule is said to be "satisfied" by the data packet and system at that time. When a particular rule is satisfied by message and system values, the data packet is processed using an action corresponding to the next rule, as described in more detail below with reference to FIG. 3C.

Sometimes address-specific actions are desirable. In some embodiments, the addresses for which specific actions are desired are listed in an address table. The parameter used as an address is one of the parameters stored during step 310 and the address values listed in the address table constitute the conditions for rules input during step 334. These address table conditions, and associated address specific actions, constitute a type of routing table for short messages and are essentially sub-rules within a rule. It is anticipated, in general, that sub-rules may be nested at any level within rules in various embodiments of the invention.

In step 336, data is received that indicates an action for the next rule. The action for the next rule is selected from among the actions stored during step 310, described above. For example, the block action is selected for conditions that are satisfied when short messages are received from a set of addresses on a blacklist.

In step 338, data is received that indicates a target for an action for the next rule. For example, certain types of messages are forwarded to a vote-counting server, e.g., application server 160, and bypass the SMSC; and an address for server 160 is the target of the forwarding action. In some embodiments the target is a group of destinations, and step 338 includes receiving input that gives the multiple destinations of a target group and a target group name. In some of these embodiments, step 338 includes receiving input data that indicates the target selection algorithm to use. For example, data is received during step 338 that indicates the weighted round-robin (WRR) algorithm is to be used to select a destination among the destinations in the target group; and the weights for each destination in the target group are also received from the service provider.

In step 339, it is determined whether the rule just entered is the last rule in the rule set for the current trigger. If not, control passes back to steps 332, 334, 336, 338 to input the next rule in the rule set. If it is determined that the rule just entered is the last rule in the rule set for the current trigger, then control passes to step 329.

In step 329, it is determined whether the trigger whose rule set was just entered is the last trigger for special processing of short messages. If not, control passes back to step 322 to begin input for the next trigger and its rule set. If it is determined that the trigger is the last trigger, then control passes to step 340 to start processing data packets.

For purposes of illustration, it is assumed that the there are only three performers eligible to receive votes, and their corresponding telephone numbers are 900-555-2207, -2211, and -2217. Votes sent to any of the other 197 phone numbers in the vote sponsor bank are erroneous. The vote sponsor wishes the provider to forward such messages to an error server that returns to such voters an error message that invites the person to vote again (thus providing the vote sponsor with another fee). It is further assumed, for purposes of illustration, that the error server has an IP address of 100.1.1.1 and subsystem port number 191. It is further assumed, for purposes of illustration, that correct votes are counted at a bank of servers, like server 160, with IP addresses of 100.1.1.2, 100.1.1.3, 100.1.1.9 and 100.1.1.10 and subsystem port number 199. It is assumed that these destinations are included in a target group named VCounters input by the provider during step 338. It is further assumed that during step 338, the provider indicated that votes should be distributed to the servers in the group using a weighted round robin (WRR) target selection algorithm, giving ten times the weight to the two more modern servers at the higher IP addresses. Table 3 shows a rule set that the short message service provider might define using the illustrated embodiment of the invention. In some embodiments, the address specific actions indicated in the first three rules of the table are entered as an address table for a single rule in the voting rule set. In some embodiments, the parameter for rule 200 is empty, thus indicating that all messages reaching rule 200 are sent to the error server.

TABLE 3

A voting rule set to apply when a voting trigger is pulled.

| rule index | parameter | value | action | target | selection algorithm |
|---|---|---|---|---|---|
| 100 | dest-sme | 900-555-2207 | group | VCounters | WRR (1,1,10,10) |
| 110 | dest-sme | 900-555-2211 | group | VCounters | WRR (1,1,10,10) |
| 120 | dest-sme | 900-555-2217 | group | VCounters | WRR (1,1,10,10) |
| 200 | dest-sme | 900-555-22* | group | 100.1.1.1 port 191 | Single group member |

Figure 3C:
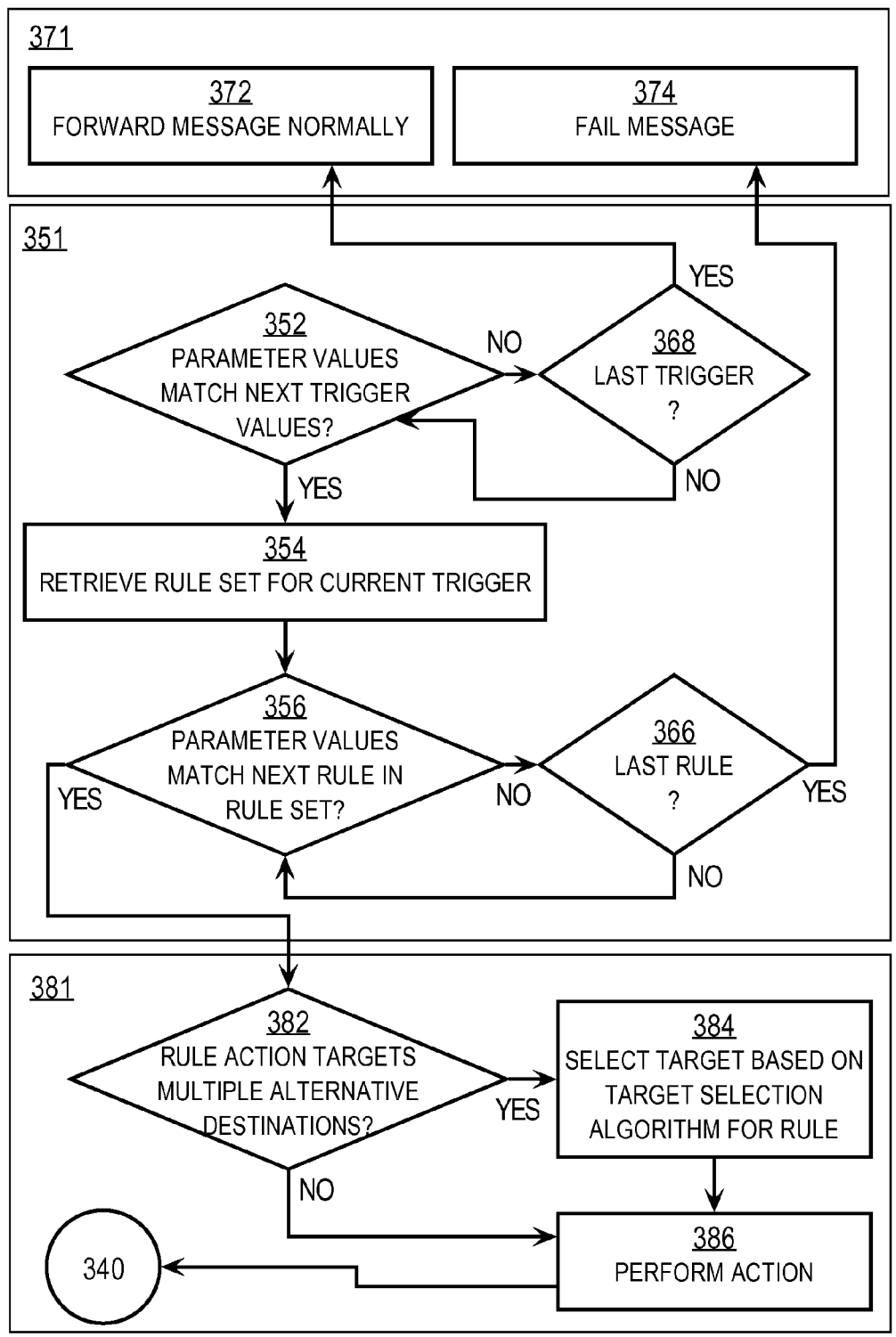
FIG. 3C is a flow diagram that illustrates in more detail steps of the method of FIG. 3A for processing short messages based on provider input, according to an embodiment.

FIG. 3C is a flow diagram that illustrates in more detail steps 351, 371, 381 for dynamically processing short messages based on provider input describing conditions and actions, according to an embodiment of method 300. Steps 351, 371, 381 are particular embodiments of steps 350, 370, 380, respectively.

Step 371 performs default behavior and includes steps 372 and 374. In step 372 the data packet is forwarded normally. In step 372 the data packet is dropped, thus causing a short message to fail.

Step 351 includes steps 352, 354, 356, 366 and 368. In step 352, it is determined whether the current values of parameters match the trigger values for a next trigger of any triggers defined in step 322, described above. If not, control passes to step 368 to determine whether there are any more triggers. In step 368 it is determined whether the trigger values just tested belong to the last trigger. If they do belong to the last trigger, control passes to step 372 to process the short message normally, e.g., forward to a SMSC. For example, if a short message data packet is received that is not directed to the vote sponsor's block and is not directed to or received from the wire-tap telephone number, then control passes to step 368 several times; once after the data packet values do not match the voting trigger and again after the data packet values do not match the wire-tap triggers. Control then flows to step 372 to forward the data packet normally.

In the general embodiment just described, there are multiple triggers. In a preferred embodiment, there is one trigger for all short messages. That single trigger consists of information such as the SMSC PC and subsystem and MAP layer information that identify the operation as a short message. The rules' parameter information then specifies application contents of the message such as origin SME, destination SME, etc. for distinctive processing. An advantage of the single trigger is that all data packets traveling through ITPs are subjected to a trigger test, so performance is enhanced if there is only one trigger that separates data packets for special processing from other data packets, such as SS7 signaling packets that are not subject to short message processing.

If it is determined during step 352 that the current values of parameters match the trigger values for a trigger, control passes to step 354. In step 354, a rule set associated with the trigger is retrieved. For example, in the illustrated embodiment, if the voting trigger is matched by the current short message data packet, the rule set illustrated in Table 3 is retrieved. It is assumed, for purposes of illustration, that a short message data packet is received with a dest-sme value of 900-555-2217. This value matches the voting trigger and causes the rule set of Table 3 to be retrieved.

In step 356, it is determined whether the actual values for the rule parameters matches the special rule values input by the provider in step 334. If not, control passes to step 366 to determine whether the current rule is the last rule in the rule set. If it is determined in step 366 that the rule just attempted is not the last rule in the rule set, then control passes back to step 356 to determine whether a match is obtained in the conditions for the next rule. If it is determined in step 366 that the last rule of the rule set has just been tested and found not to match, then control passes to step 374 to fail the message, e.g., to drop the message.

For example, in the illustrated example, the actual value 900-555-2217 of the dest-sme parameter does not match the value 900-555-2207 for that parameter in rule 100. It is determined in step 366 that rule 100 is not the last rule in the rule set, so control passes back to step 356 to check the conditions for rule 110. Similarly, the actual value does not match the value of dest-sme in rule 110, so control passes back to step 356 to test rule 120.

If it is determined in step 356 that the actual values for the rule parameters match the special rule values input by the provider in step 334 for the next rule, then control passes to step 381 to perform the action associated with the next rule.

Step 381 includes steps 382, 384 and 386. In step 382, it is determined whether multiple destinations are the target of the action for the next rule. If not, control passes to step 386 to perform the action. If it is determined that multiple destinations are the target of the action for the next rule, then control passes to step 384.

In step 384, one or more destinations are selected based on the algorithm associated with the current rule. Example target selection rules are described above. For example, as shown in Table 3, the target of rule 120 is the target group VCounters of multiple servers; so control passes to step 384. In step 384 the WRR target selection algorithm with weights (1, 1, 10, 10) associated with the rule 120 is used to determine the destination for the short message in the data packet. This WRR will evenly distribute the first 4 messages between the four servers, but the next 18 messages will alternate between the two servers (e.g., at IP addresses 100.1.1.9 and 100.1.1.10) configured with a weight of 10. The distribution cycle then repeats after the first 22 messages are delivered. Control then passes to step 386 to perform the action specified, which is to forward the short message to the selected destination.

In another example, the actual value of the dest-sme parameter in the received data packet is assumed to be 900-555-2201, for purposes of illustration. Thus this short message does not satisfy the conditions of rules 100, 110 or 120. The actual values of the parameters satisfy the rule values for rule 200. Control passes to step 382. In step 382 it is determined that the rule 200 action does not target multiple destinations. Thus step 384 is skipped and control passes directly to step 386. In step 386 the short message is forwarded to the group for the error message server at IP address 100.1.1.1, port 191.

Using techniques of method 300, a provider can change the dynamic distribution of short messages by an IP gateway without further involvement by the vendor of the IP gateway. At the same time, the vendor of IP gateways is freed from consuming resources to continually change the short message distribution service.

3.0 Implementation Mechanisms—Hardware Overview

Figure 4:
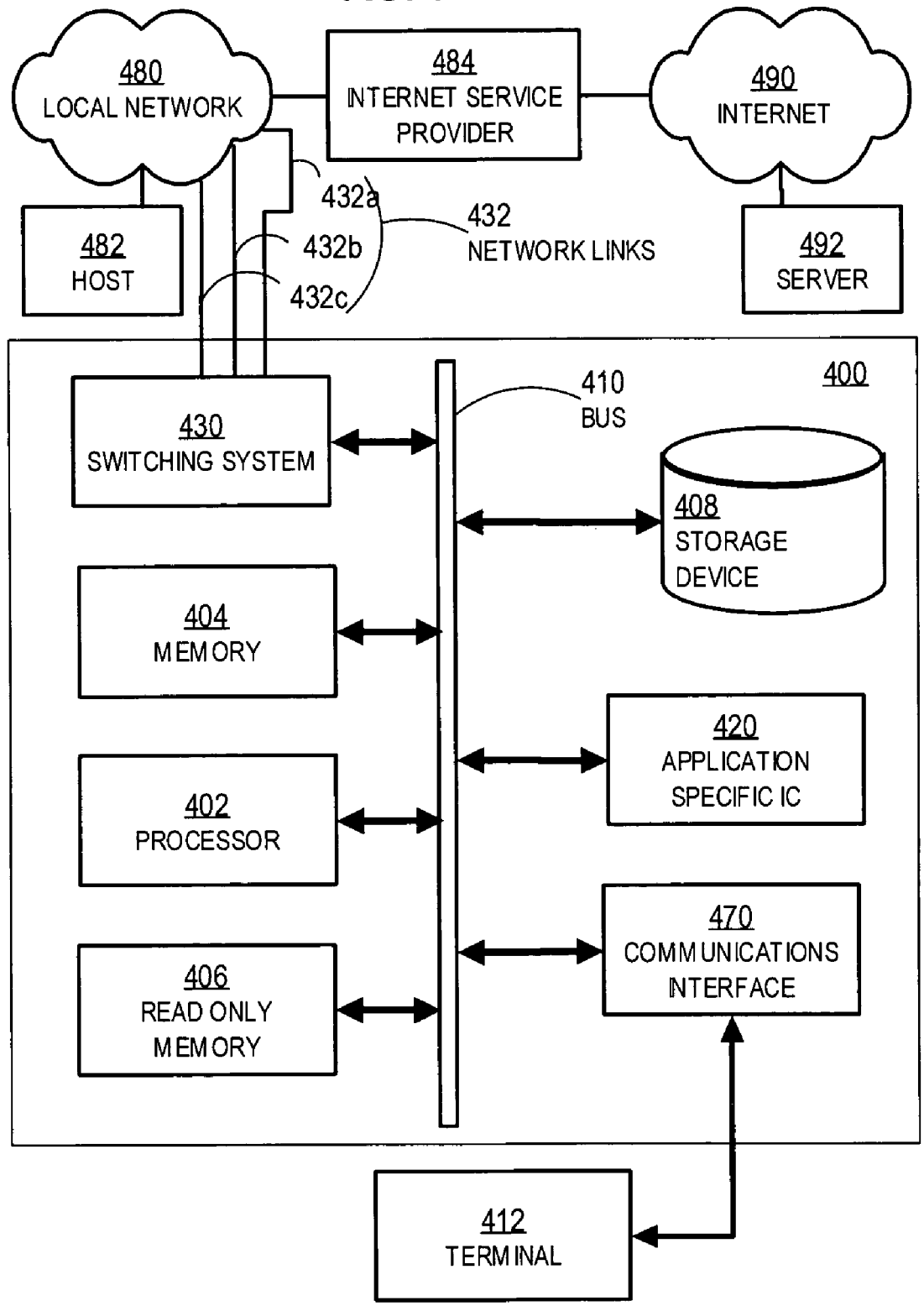
FIG. 4 is a block diagram that illustrates a computer system 400 upon which an embodiment of the invention may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 410 for use by the processor from an external terminal 412, such as a terminal with a keyboard containing alphanumeric keys operated by a human user, or a sensor. A sensor detects conditions in its vicinity and transforms those detections into signals compatible with the signals used to represent information in computer system 400. Other external components of terminal 412 coupled to bus 410, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 412. In some embodiments, terminal 412 is omitted.

Computer system 400 also includes one or more instances of a communications interface 470 coupled to bus 410. Communication interface 470 provides a two-way communication coupling to a variety of external devices that operate with their own processors, such as printers, scanners, external disks, and terminal 412. Firmware or software running in the computer system 400 provides a terminal interface or character-based command interface so that external commands can be given to the computer system. For example, communication interface 470 may be a parallel port or a serial port such as an RS-232 or RS-422 interface, or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, which carry information streams, such as digital data. Such signals are examples of carrier waves.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 400 includes switching system 430 as special purpose hardware for switching information for flow over a network. Switching system 430 typically includes multiple communications interfaces, such as communications interface 470, for coupling to multiple other devices. In general, each coupling is with a network link 432 that is connected to another device in or attached to a network, such as local network 480 in the illustrated embodiment, to which a variety of external devices with their own processors are connected. In some embodiments an input interface or an output interface or both are linked to each of one or more external network elements. Although three network links 432a, 432b, 432c are included in network links 432 in the illustrated embodiment, in other embodiments, more or fewer links are connected to switching system 430. Network links 432 typically provide information communication through one or more networks to other devices that use or process the information. For example, network link 432b may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides routing information for use with switching system 430.

The switching system 430 includes logic and circuitry configured to perform switching functions associated with passing information among elements of network 480, including passing information received along one network link, e.g. 432a, as output on the same or different network link, e.g., 432c. The switching system 430 switches information traffic arriving on an input interface to an output interface according to pre-determined protocols and conventions that are well known. In some embodiments, switching system 430 includes its own processor and memory to perform some of the switching functions in software. In some embodiments, switching system 430 relies on processor 402, memory 404, ROM 406, storage 408, or some combination, to perform one or more switching functions in software. For example, switching system 430, in cooperation with processor 404 implementing a particular protocol, can determine a destination of a packet of data arriving on input interface on link 432a and send it to the correct destination using output interface on link 432c. The destinations may include host 482, server 492, other terminal devices connected to local network 480 or Internet 490, or other routing and switching devices in local network 480 or Internet 490.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420 and circuits in switching system 430, may be used in place of or in combination with software to implement the invention. Thus, embodiments of the invention are not limited to any specific combination of hardware and software.

The signals transmitted over network link 432 and other networks through communications interfaces such as interface 470, which carry information to and from computer system 400, are exemplary forms of carrier waves. Computer system 400 can send and receive information, including program code, through the networks 480, 490 among others, through network links 432 and communications interfaces such as interface 470. In an example using the Internet 490, a server 492 transmits program code for a particular application, requested by a message sent from computer 400, through Internet 490, ISP equipment 484, local network 480 and network link 432b through communications interface in switching system 430. The received code may be executed by processor 402 or switching system 430 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 432b. An infrared detector serving as communications interface in switching system 430 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402 or switching system 430.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for dynamically distributing short messages in a communications network, comprising the steps of:
   storing action data that indicates a plurality of actions for forwarding a short message that is formatted as a control message in a communication network but does not control the communication network, wherein the plurality of actions include an action to bypass a short message service center (SMSC);
   storing parameter data that indicates a plurality of message parameters in a plurality of network protocol headers for a data packet that includes a short message;
   receiving, from a provider of short message delivery service, provider input data that indicates
      a special value set of at least one value for a corresponding special parameter set including at least one parameter among the plurality of message parameters; and
      a special action set of at least one action of the plurality of actions to be performed if an actual value set based at least in part on a data packet received matches the special value set;
   receiving a particular data packet that includes a short message;
   determining whether an actual value set for the special parameter set based at least in part on the particular data packet matches the special value set; and
   if it is determined that the actual value set matches the special value set, then forwarding the short message according to the special action set.

2. A method as recited in claim 1, wherein the plurality of actions include at least two of:
   blocking the short message so that it is not forwarded to another device in the communication network;
   forwarding the short message to an original destination indicated in the data packet;
   forwarding the short message to the SMSC; or
   forwarding the short message to a particular destination.

3. A method as recited in claim 1, wherein the plurality of actions include at least one of:
   forwarding the short message to a target group that includes a plurality of destinations;
   forwarding the short message to fewer than all destinations in the target group; or
   forwarding the short message to one destination in the target group.

4. A method as recited in claim 3, wherein the target group includes a plurality of destinations different from any SMSC.

5. A method as recited in claim 1, wherein the plurality of actions include at least one of:
   determining whether conditions are satisfied for performing a different action;
   performing an operation to obtain from a remote network node information that is used in another action;
   using the short message in a particular process; or
   modifying the contents of the short message.

6. A method as recited in claim 1, wherein:
   said step of storing parameter data further comprises storing parameter data that indicates a plurality of system parameters that describe a state of the communication network;
   said step of receiving provider input data further comprises receiving customer data that indicates the special parameter set includes at least one system parameter among the plurality of system parameters; and
   said step of determining whether the actual value set matches the special value set further comprises:
      determining a current value for the at least one system parameter; and
      determining whether the actual value set for the special parameter set based at least in part on the current value for the at least one system parameter matches the special value set.

7. A method as recited in claim 6, said step of determining a current value for the at least one system parameter further comprising receiving from a remote process on the network a system message that includes the current value for the at least one system parameter.

8. A method as recited in claim 1, said step of receiving provider input data further comprises receiving destination data that indicates a particular destination for a particular forwarding action of the special action set.

9. A method as recited in claim 1, said step of receiving provider input data further comprises receiving target group data that indicates a plurality of destinations for a particular forwarding action of the special action set.

10. A method as recited in claim 9, wherein:
the method further comprises storing a plurality of target selection algorithms for selecting fewer than all destinations among a plurality of alternative destinations;
said step of receiving provider input data further comprises receiving provider data that indicates a particular target selection algorithm among the plurality of target selection algorithms; and
said step of forwarding the short message according to the special action set further comprises:
determining a particular destination among the target group based on the particular target selection algorithm; and
forwarding the short message to the particular destination.

11. A method as recited in claim 10, said step of determining a particular destination among the target group based on the particular target selection algorithm further comprising:
determining a current state of a destination among the target group; and
determining the particular destination based on the current state of the destination.

12. A method as recited in claim 1, said step of receiving provider input data further comprising receiving an address table comprising a plurality of records, each record comprising:
a special value set that contains a value for a particular address parameter among the plurality of message parameters; and
an action set that contains a particular action of the plurality of actions.

13. A method as recited in claim 1, said step of receiving provider input data further comprising receiving data that indicates a rule set comprising a plurality of rules, each rule comprising:
a sequence number indicating an order for the rule in the rule set;
the special value set for the rule; and
the special action set for the rule that is performed if an actual value set based at least in part on a data packet received matches the special value set for the rule.

14. A method as recited in claim 13, wherein:
the plurality of actions include performing a different rule with a different sequence number; and
performing a rule comprises
determining whether an actual value set based at least in part on the data packet received matches the special value set for the rule, and
if it is determined that the actual value set matches the special value set, then performing the action set for the rule.

15. A method as recited in claim 14, wherein the different rule is a next rule in the rule set.

16. An apparatus for dynamically distributing short messages in a communications network, comprising:
means for storing action data that indicates a plurality of actions for forwarding a short message that is formatted as a control message in a communication network but does not control the communication network, wherein the plurality of actions include an action to bypass a short message service center (SMSC);
means for storing parameter data that indicates a plurality of message parameters in a plurality of network protocol headers for a data packet that includes a short message;
means for receiving, from a provider of short message delivery service, provider input data that indicates
a special value set of at least one value for a corresponding special parameter set including at least one parameter among the plurality of message parameters; and
a special action set of at least one action of the plurality of actions to be performed if an actual value set based at least in part on a data packet received matches the special value set;
means for receiving a particular data packet that includes a short message;
means for determining whether an actual value set for the special parameter set based at least in part on the particular data packet matches the special value set; and
means for forwarding the short message according to the special action set, if it is determined that the particular value set matches the special value set.

17. An apparatus for dynamically distributing short messages in a communications network, comprising:
a network interface that is coupled to a network for communicating therewith a data packet;
one or more processors;
a computer-readable medium; and
one or more sequences of instructions stored in the computer-readable medium, which, when executed by the one or more processors, causes the one or more processors to carry out the step of:
storing action data that indicates a plurality of actions for forwarding a short message that is formatted as a control message in a communication network but does not control the communication network, wherein the plurality of actions include an action to bypass a short message service center (SMSC);
storing parameter data that indicates a plurality of message parameters in a plurality of network protocol headers for a data packet that includes a short message;
receiving provider input data that indicates
a special value set of at least one value for a corresponding special parameter set including at least one parameter among the plurality of message parameters, and
a special action set of at least one action of the plurality of actions to be performed if an actual value set based at least in part on a data packet received matches the special value set;
receiving a particular data packet that includes a short message;
determining whether an actual value set for the special parameter set based at least in part on the particular data packet matches the special value set; and
if it is determined that the actual value set matches the special value set, then forwarding the short message according to the special action set.

18. An apparatus as recited in claim 17, wherein the plurality of actions include at least two of:
blocking the short message so that it is not forwarded to another device in the communication network;
forwarding the short message to an original destination indicated in the data packet;
forwarding the short message to the SMSC; or
forwarding the short message to a particular destination.

19. An apparatus as recited in claim 17, wherein the plurality of actions include at least one of:
forwarding the short message to a target group that includes a plurality of destinations;

forwarding the short message to fewer than all destinations in the target group; or forwarding the short message to one destination in the target group.

20. An apparatus as recited in claim 19, wherein the target group includes a plurality of destinations different from any SMSC.

21. An apparatus as recited in claim 17, wherein the plurality of actions include at least one of:
   determining whether conditions are satisfied for performing a different action;
   performing an operation to obtain from a remote network node information that is used in another action;
   using the short message in a particular process; or
   modifying the contents of the short message.

22. An apparatus as recited in claim 17, wherein:
   said step of storing parameter data further comprises storing parameter data that indicates a plurality of system parameters that describe a state of the communication network;
   said step of receiving provider input data further comprises receiving customer data that indicates the special parameter set includes at least one system parameter among the plurality of system parameters; and
   said step of determining whether the actual value set matches the special value set further comprises:
      determining a current value for the at least one system parameter; and
      determining whether the actual value set for the special parameter set based at least in part on the current value for the at least one system parameter matches the special value set.

23. An apparatus as recited in claim 22, said step of determining a current value for the at least one system parameter further comprising receiving from a remote process on the network a system message that includes the current value for the at least one system parameter.

24. An apparatus as recited in claim 17, said step of receiving provider input data further comprises receiving destination data that indicates a particular destination for a particular forwarding action of the special action set.

25. An apparatus as recited in claim 17, said step of receiving provider input data further comprises receiving target group data that indicates a plurality of destinations for a particular forwarding action of the special action set.

26. An apparatus as recited in claim 25, wherein:
   execution of the one or more sequences of instructions by the one or more processors further causes the one or more processors to carry out the step of storing a plurality of target selection algorithms for selecting fewer than all destinations among a plurality of alternative destinations;
   said step of receiving provider input data further comprises receiving provider data that indicates a particular target selection algorithm among the plurality of target selection algorithms; and
   said step of forwarding the short message according to the special action set further comprises:
      determining a particular destination among the target group based on the particular target selection algorithm; and
      forwarding the short message to the particular destination.

27. An apparatus as recited in claim 26, said step of determining a particular destination among the target group based on the particular target selection algorithm further comprising:

determining a current state of a destination among the target group; and
determining the particular destination based on the current state of the destination.

28. An apparatus as recited in claim 17, said step of receiving provider input data further comprising receiving an address table comprising a plurality of records, each record comprising:
   a special value set that contains a value for a particular address parameter among the plurality of message parameters; and
   an action set that contains a particular action of the plurality of actions.

29. An apparatus as recited in claim 17, said step of receiving provider input data further comprising receiving data that indicates a rule set comprising a plurality of rules, each rule comprising:
   a sequence number indicating an order for the rule in the rule set;
   the special value set for the rule; and
   the special action set for the rule that is performed if an actual value set based at least in part on a data packet received matches the special value set for the rule.

30. An apparatus as recited in claim 29, wherein:
   the plurality of actions include performing a different rule with a different sequence number; and
   performing a rule comprises
      determining whether an actual value set based at least in part on the data packet received matches the special value set for the rule, and
      if it is determined that the actual value set matches the special value set, then performing the action set for the rule.

31. An apparatus as recited in claim 30, wherein the different rule is a next rule in the rule set.

32. A system for dynamically distributing short messages in a communications network, comprising:
   a plurality of network nodes that each include
      a network interface that is coupled to a network for communicating therewith a data packet,
      one or more processors, and
      a computer-readable medium; and
   a first set of one or more sequences of instructions stored in the computer-readable medium of a first network node of the plurality of network nodes, which, when executed by the one or more processors of the first network node, causes the one or more processors of the first network node to carry out the steps of:
      storing action data that indicates a plurality of actions for forwarding a short message that is formatted as a control message in a communication network but does not control the communication network, wherein the plurality of actions include an action to bypass a short message service center (SMSC);
      storing parameter data that indicates a plurality of message parameters in a plurality of network protocol headers for a data packet that includes a short message;
      receiving provider input data that indicates
         a special value set of at least one value for a corresponding special parameter set including at least one parameter among the plurality of message parameters, and
         a special action set of at least one action of the plurality of actions to be performed if the an actual value set based at least in part on a data packet received matches the special value set; and sending the value action set and the special action set to a second network node of the plurality of network nodes; and a second set of one or more sequences of instructions stored in the computer-readable medium of the second network node, which, when executed by the one or more processors of the second network node, causes the one or more processors of the second network node to carry out the steps of:

receiving a particular data packet that includes a short message;

determining whether an actual value set for the special parameter set based at least in part on the particular data packet matches the special value set; and if it is determined that the actual value set matches the special value set, then forwarding the short message according to the special action set.

* * * * *

UNITED STATES PATENT AND TRADEMARK OFFICE
CERTIFICATE OF CORRECTION

PATENT NO. : 7,209,759 B1 Page 1 of 1
APPLICATION NO. : 11/159949
DATED : April 24, 2007
INVENTOR(S) : Billing et al.

It is certified that error appears in the above-identified patent and that said Letters Patent is hereby corrected as shown below:

Title Page # 75
1. The address of inventor Michael Wright is Cary, NC (US)
2. Delete "to" in claim 16, column 21, line 66.

Signed and Sealed this

Twelfth Day of June, 2007

JON W. DUDAS
*Director of the United States Patent and Trademark Office*